US011620722B2

(12) United States Patent
Choi (10) Patent No.: US 11,620,722 B2
(45) Date of Patent: Apr. 4, 2023

(54) METHOD AND APPARATUS OF GENERATING POLICY-BASED SMART CONTRACT

(71) Applicant: Electronics and Telecommunications Research Institute, Daejeon (KR)

(72) Inventor: Yun Chul Choi, Sejong-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 4 days.

(21) Appl. No.: 17/102,916

(22) Filed: Nov. 24, 2020

(65) Prior Publication Data

US 2021/0158464 A1 May 27, 2021

(30) Foreign Application Priority Data

Nov. 27, 2019 (KR) .......... 10-2019-0154591
Nov. 17, 2020 (KR) .......... 10-2020-0153800

(51) Int. Cl.
*G06F 17/00* (2019.01)
*G06Q 50/18* (2012.01)
*G06F 40/186* (2020.01)
*G06F 40/174* (2020.01)
*H04L 9/32* (2006.01)
*G06F 40/205* (2020.01)
*H04L 9/00* (2022.01)

(52) U.S. Cl.
CPC ......... *G06Q 50/188* (2013.01); *G06F 40/174* (2020.01); *G06F 40/186* (2020.01); *G06F 40/205* (2020.01); *H04L 9/3236* (2013.01); *H04L 9/50* (2022.05)

(58) Field of Classification Search
None
See application file for complete search history.

(56) References Cited

U.S. PATENT DOCUMENTS

| 2013/0346353 | A1 | 12/2013 | Suh et al. | |
| 2017/0061352 | A1* | 3/2017 | Kogut-O'Connell | ........ G06Q 50/18 |
| 2018/0198794 | A1 | 7/2018 | Huh et al. | |
| 2018/0218176 | A1* | 8/2018 | Voorhees | ........ G06Q 20/02 |

FOREIGN PATENT DOCUMENTS

| CN | 109003078 A | 12/2018 |
| JP | 2018-36893 A | 3/2018 |
| KR | 10-2018-0112061 A | 10/2018 |
| KR | 10-1946196 B1 | 2/2019 |
| KR | 10-2019-0088531 A | 7/2019 |
| KR | 10-2019-0094188 A | 8/2019 |
| KR | 10-2008001 B1 | 8/2019 |
| KR | 10-2013527 B1 | 8/2019 |
| KR | 10-2020-0088827 A | 7/2020 |
| WO | WO 2020/041878 A1 | 3/2020 |

* cited by examiner

*Primary Examiner* — Mustafa A Amin
(74) *Attorney, Agent, or Firm* — NSIP Law (57) ABSTRACT

The present invention prevents an error of a blockchain-based smart contract and an error occurring in a process of cooperating with a conventional smart contract and uses a smart contract template, thereby enhancing convenience in writing a smart contract.

18 Claims, 6 Drawing Sheets

METHOD AND APPARATUS OF GENERATING POLICY-BASED SMART CONTRACT

CROSS-REFERENCE TO RELATED APPLICATIONS

This application claims priority under 35 U.S.C. § 119 to Korean Patent Application No. 10-2019-0154591, filed on Nov. 27, 2019 and Korean Patent Application No. 10-2020-0153800, filed on Nov. 17, 2020, the disclosure of which is incorporated herein by reference in its entirety.

TECHNICAL FIELD

The present invention relates to technology associated with a blockchain-based smart contract.

BACKGROUND

A blockchain-based smart contract, unlike conventional contract written in writing, is written in a computer programming language and performs contract content on the basis of a preprogrammed contract condition when a contract fulfillment request is received.

A smart contract has an advantage where a developer or a user may directly write a contract condition and contract content in a programming language. However, unlike a conventional programming environment, a smart contract is written at a time, and it is impossible to apply a patch. Due to such a problem, there are a re-entry problem, a transaction order problem, a timestamp dependency problem, an overflow problem, a significant information exposure problem, etc.

SUMMARY

Accordingly, the present invention provides a method and apparatus of performing a policy-based smart contract, which solves a re-entry problem, a transaction order problem, a timestamp dependency problem, an overflow problem, and a significant information exposure problem occurring in a process of constructing (or generating) a smart contract and defend against an external malicious attack.

In one general aspect, a method of generating a policy-based smart contract in a smart contract generating apparatus communicating with a user terminal includes: parsing, by using a first parsing module, smart contract information received from the user terminal to obtain basic information representing content of a smart contract and policy information representing an execution condition of the smart contract; generating, by using a smart contract template generating module, a smart contract template on the basis of the obtained basic information; parsing, by using a second parsing module, previous smart contract information read from a blockchain or an external storage to obtain previous basic information representing content of a previous smart contract and previous policy information representing an execution condition of the previous smart contract; verifying, by using a verification module, the basic information and the policy information on the basis of the previous basic information and the previous policy information; and combining, by using a smart contract generating module, the generated smart contract template with the policy information and the basic information, on which verification is completed by the verification module, to generate the policy-based smart contract.

In another general aspect, a smart contract generating apparatus includes: a communication module configured to receive smart contract information, needed for generating a smart contract which is to be generated by a user, from a user terminal; a first parsing module configured to parses the smart contract information received from the communication module to obtain basic information representing content of a smart contract and policy information representing an execution condition of the smart contract; a smart contract template generating module configured to generates a smart contract template on the basis of the basic information input from the first parsing module; a search module configured to search for previous smart contract information, which is capable of being affiliated with the smart contract information, in a blockchain or a storage on the basis of the basic information input from the first parsing module to read the found previous smart contract information from the blockchain or the storage; a second parsing module configured to parse the previous smart contract information input from the search module to obtain previous basic information representing content of a previous smart contract and previous policy information representing an execution condition of the previous smart contract; a verification module configured to verify the basic information and the policy information input from the first parsing module on the basis of the previous basic information and the previous policy information input from the second parsing module; and a smart contract configured to generate module configured to combine the smart contract template with the policy information and the basic information, on which verification is completed by the verification module, to generate a policy-based smart contract.

In an embodiment, the smart contract template generating module implements each of pieces of information, associated with a seller, a purchaser, an agent, price, a commission, a contract start date, and a contract end date included in the basic information, as a code and converts the code into a template form to generate the smart contract template.

In an embodiment, the verification module verifies an error occurring in a process of generating the smart contract and an error occurring in a process of affiliating the smart contract with the previous smart contract, based on a state diagram which affiliates the basic information with the previous basic information on the basis of the policy information and the previous policy information.

In an embodiment, the state diagram is a program including: a plurality of previous state nodes representing a state of the previous basic information; a plurality of current state nodes representing a state of the basic information; a first connection line connecting the plurality of previous state nodes to the plurality of current state nodes on the basis of the previous policy information; and a second connection line connecting the plurality of current state nodes on the basis of the policy information.

In an embodiment, when the states of all of the plurality of previous state nodes and the plurality of current state nodes are changed, the verification module determines that there is no error in the basic information and the policy information, based on the input of the input value.

Other features and aspects will be apparent from the following detailed description, the drawings, and the claims.

DETAILED DESCRIPTION OF EMBODIMENTS

Hereinafter, embodiments of the present invention will be described in detail with reference to the accompanying drawings. Embodiments of the present invention are provided so that this disclosure will be thorough and complete, and will fully convey the concept of the present invention to one of ordinary skill in the art. Since the present invention may have diverse modified embodiments, preferred embodiments are illustrated in the drawings and are described in the detailed description of the present invention. However, this does not limit the present invention within specific embodiments and it should be understood that the present invention covers all the modifications, equivalents, and replacements within the idea and technical scope of the present invention. Like reference numerals refer to like elements throughout.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. In various embodiments of the disclosure, the meaning of 'comprise', 'include', or 'have' specifies a property, a region, a fixed number, a step, a process, an element and/or a component but does not exclude other properties, regions, fixed numbers, steps, processes, elements and/or components.

Figure 1:
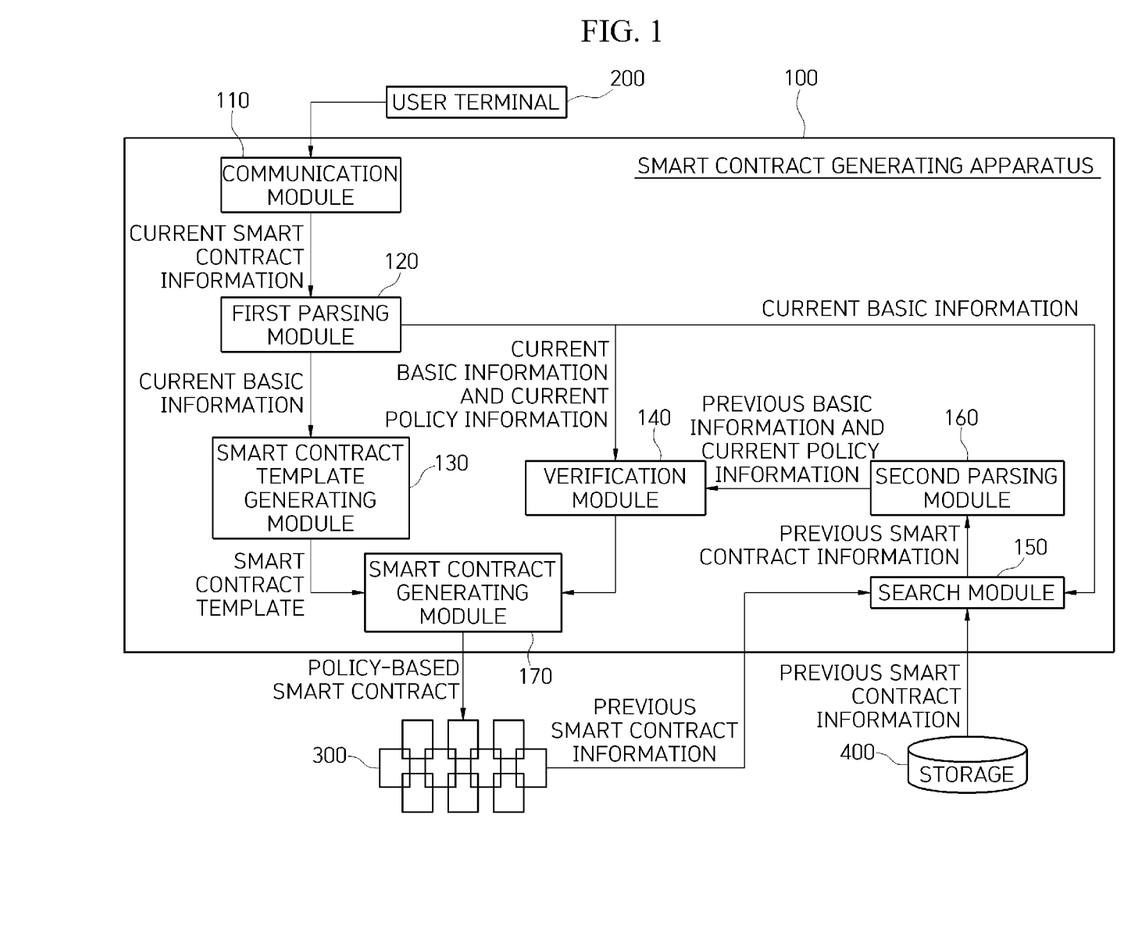
FIG. 1 is a block diagram schematically illustrating an internal configuration of a smart contract generating apparatus according to an embodiment of the present invention.

FIG. 1 is a block diagram schematically illustrating an internal configuration of a smart contract generating apparatus 100 according to an embodiment of the present invention.

Referring to FIG. 1, the smart contract generating apparatus 100 may generate (or construct) a policy-based smart contract and may verify an error which occurs in a process of generating (or constructing) the smart contract.

The smart contract generating apparatus 200 may communicate with a user terminal 200 over a wired or wireless communication network. Here, the user terminal 200 may include, for example, a mobile terminal, a smartphone, and a tablet personal computer (PC).

A user application (user apps) such as a wallet application (wallet apps) may be installed in the user terminal 200.

A user may transmit, to the smart contract generating apparatus 200, smart contract information (hereinafter referred to as current smart contract information) needed for generating (or constructing) a smart contract by using the user terminal 200 or a user application installed in the user terminal 200.

Current smart contract information may be configured in a web-based file form to include basic information and policy information needed for a smart contract which is to be generated (constructed) by the user. Here, the web-based file form may be, for example, JavaScript object notation (JSON).

Hereinafter, in order to avoid confusion with a different term, basic information and policy information included in the current smart contract information may be respectively referred to as current basic information and current policy information.

Current basic information may include, for example, seller-related information, purchaser-related information, agent-related information, price-related information, information associated with a commission provided to an agent, information associated with a contract start date, and information associated with a contract end date, which are needed for generating (or constructing) a smart contract. Current policy information may include information associated with a condition for executing a smart contract, constructed based on the current basic information, in a blockchain 300.

The condition for executing the smart contract may include, for example, a date at which a specific event occurs. Here, the specific event may include notification, time, resources (a coin, a storage space, and a computing power). In this case, the policy information may define a specific time, a specific resource, and specific notification for executing a smart contract.

The smart contract generating apparatus 100 may generate (or construct) a policy-based smart contract by using the current smart contract information transmitted from the user terminal 200 (or the user application installed in the user terminal 200).

To this end, the smart contract generating apparatus 100 may include, for example, a communication module 110, a first parsing module 120, a smart contract template generating module 130, a verification module 140, a search module 150, a second parsing module 160, and a smart contract generating module 170.

Additionally, although not shown, the smart contract generating apparatus 100 may further include a basic element configuring a computing device such as a processor (for example, a central processing unit (CPU), a graphics processing unit (GPU), etc.), a volatile memory, a non-volatile memory, and a user interface. Therefore, the smart contract generating apparatus 100 may be referred to as a computing device.

Unless described, the elements 110 to 160 of the smart contract generating device 100 illustrated in FIG. 1 may include a software module, a hardware module, or a combination thereof, which is driven (or executed) based on control by the processor, and the elements 120 to 170 other than the communication module 110 or some of the elements 120 to 170 may each be designed as a logic type to be integrated into one processor.

The communication module 110 may receive current smart contract information from the user terminal 200 (or a user application installed in the user terminal 200) over the wired or wireless communication network (not shown) and may input the current smart contract information to the first parsing module 120.

The first parsing module 120 may parse the current smart contract information input from the communication module 110 to obtain (extract) current basic information and current policy information from the current smart contract information.

As described above, the current basic information may include, for example, seller-related information (hereinafter referred to as current seller information), purchaser-related information (hereinafter referred to as current purchaser information), agent-related information (hereinafter referred to as current agent information), price-related information (hereinafter referred to as current price information), information associated with a commission provided to an agent (hereinafter referred to as current commission information), information associated with a contract start date, and information associated with a contract end date, which are needed for generating (or constructing) a smart contract. The current policy information may include information associated with a condition for executing a smart contract in the blockchain 300.

Basic information obtained by the first parsing module 120 may be input to the smart contract template generating module 130, the verification module 140, and the search module 150. Policy information obtained by the first parsing module 120 may be further input to the verification module 140.

The smart contract template generating module 130 may generate a smart contract template on the basis of the current basic information input from the first parsing module 120. Here, pieces of information associated with a seller, a purchaser, an agent, price, a commission, a contract start date, and a contract end date may be implemented as code, and the smart contract template may be implemented by converting the code into a template form.

The policy verification module 140 may verify an error which occurs in a process of affiliating the current smart contract information, including the current policy information and the current basic information input from the first parsing module 120, with previous smart contract information including previous policy information and previous basic information input from the second parsing module 160.

The error occurring in the affiliating process may include a re-entry problem, an error associated with a transaction order, an error associated with timestamp dependency, an error associated with overflow, and an error associated with significant information exposure, and by performing error verification, a collision between a previous smart contract and a current smart contract may be prevented. A policy verification method will be described below in detail with reference to FIG. 2.

The search module 150 may search for information associated with previous smart contract (hereinafter referred to as previous smart contract information) stored in an external storage 400 or the blockchain 300 by using the current basic information input from the first parsing module 120.

For example, the search module 150 may search for previous smart contract information stored in an external storage 400 or the blockchain 300 by using the current basic information as a query. When the previous smart contract information is found, the found previous smart contract information may be found by using the current basic information, obtained from the current smart contract information, as a query, and thus, may be information which is affiliated with the current smart contract information.

When the search module 150 searches for the previous smart contract information, the search module 150 may read the found previous smart contract information from the blockchain 300 or the storage 400 and may input the previous smart contract information to the second parsing module 160.

The second parsing module 160 may parse the previous smart contract information to obtain (extract) previous basic information from the previous smart contract information, so that the policy verification module 140 verifies an error occurring in a process of affiliating the current smart contract information with the previous smart contract information.

The previous basic information, like the current basic information described above, may include seller-related information, purchaser-related information, agent-related information, price-related information, information associated with a commission provided to an agent, information associated with a contract start date, and information associated with a contract end date, which are needed for generating (or constructing) a previous smart contract. Like the current policy information described above, previous policy information may include information associated with a condition for executing the previous smart contract, constructed based on the previous basic information, in the blockchain 300.

The smart contract generating module 170 may combine the current policy information and the current basic information, where it is determined through verification by the policy verification module 140 that there is no error, with a smart contract template input the smart contract template generating module 130 to generate a policy-based smart contract which is to be generated (constructed) by the user and may upload (store) the generated policy-based smart contract to (in) the blockchain 300 or the storage 400.

Hereinafter, a policy verification method performed by the policy verification module 140 will be described with reference to FIG. 2.

Figure 2:
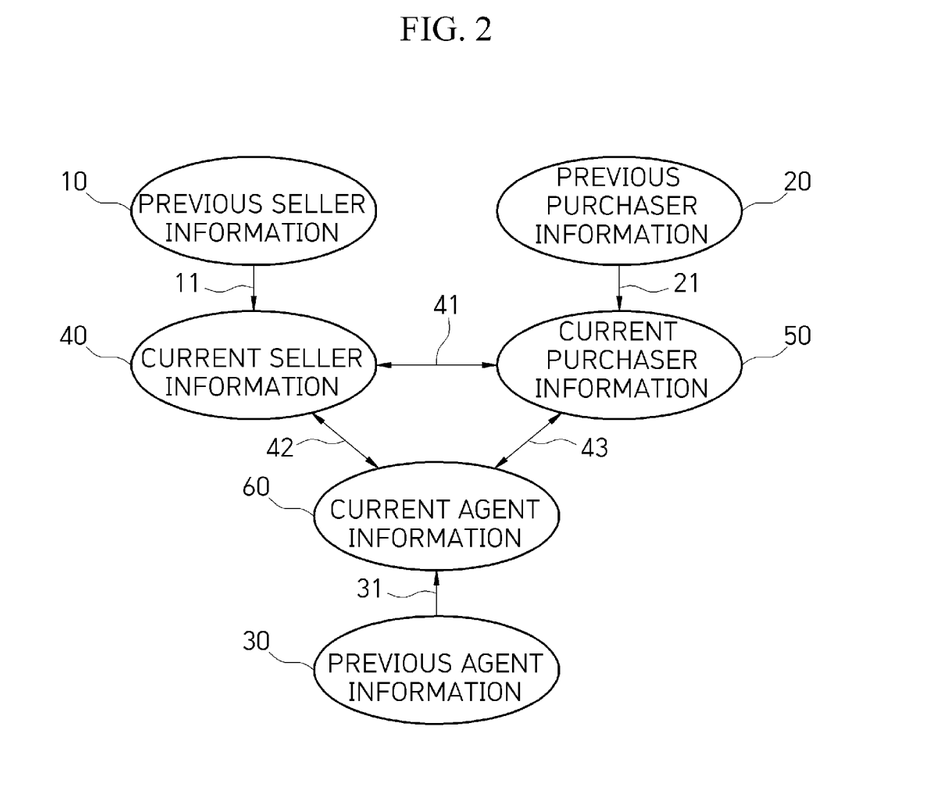
FIG. 2 is a diagram for describing a policy verification method performed by a policy verification module illustrated in FIG. 1.

FIG. 2 is a diagram for describing a policy verification method performed by the policy verification module illustrated in FIG. 1.

Referring to FIG. 2, in order to verify an error occurring in a process of affiliating current smart contract information with previous smart contract information, the policy verification module 140 may perform policy verification by using a state diagram which is constructed by using current basic information and current policy information input from the first parsing module 120 and previous basic information and previous policy information input from the second parsing module 160.

In detail, first, the state diagram constructed by the policy verification module 140 may be schematized as previous state nodes 10 to 30 representing a state of previous basic information, current state nodes 40 to 60 representing a state of current basic information, and connection lines 11, 21, 31, 41, 42, and 43 connecting the previous state nodes 10 to 30 and the current state nodes 40 to 60.

The previous state node 10 may represent, for example, a state of previous seller information included in the previous basic information. The previous state node 20 may represent, for example, a state of previous purchaser information included in the previous basic information. The previous state node 30 may represent, for example, a state of previous agent information included in the previous basic information.

The current state node 40 may represent, for example, a state of current seller information included in the current basic information. The current state node 50 may represent, for example, a state of current purchaser information included in the current basic information. The current state node 60 may represent, for example, a state of current agent information included in the current basic information.

Each of the connection lines 11, 21, and 31 may denote that a condition for executing a previous smart contract on the basis of previous policy information is represented by a unidirectional arrow. The connection line 11 may connect the previous state node 10, corresponding to the previous seller information, to the current state node 40 corresponding to the current seller information. The connection line 21 may connect the previous state node 20, corresponding to the previous purchaser information, to the current state node 50 corresponding to the current purchaser information. The connection line 31 may connect the previous state node 30, corresponding to the previous agent information, to the current state node 60 corresponding to the current agent information.

Each of the connection lines 41 to 43 may denote that a condition for executing a current smart contract which is to be constructed by the user on the basis of current policy information is represented by a bidirectional arrow. The connection line 41 may connect the current state node 40, corresponding to the current seller information, to the current state node 50 corresponding to the current purchaser information. The connection line 42 may connect the current state node 40, corresponding to the current seller information, to the current state node 60 corresponding to the current agent information. The connection line 43 may connect the current state node 60, corresponding to the current agent information, to the current state node 50 corresponding to the current purchaser information.

When constructing of the state diagram is completed, the policy verification module 140 may start to perform a policy verification operation on the basis of the state diagram. The policy verification operation may be an operation of checking three state flows in the state diagram.

Figure 3:
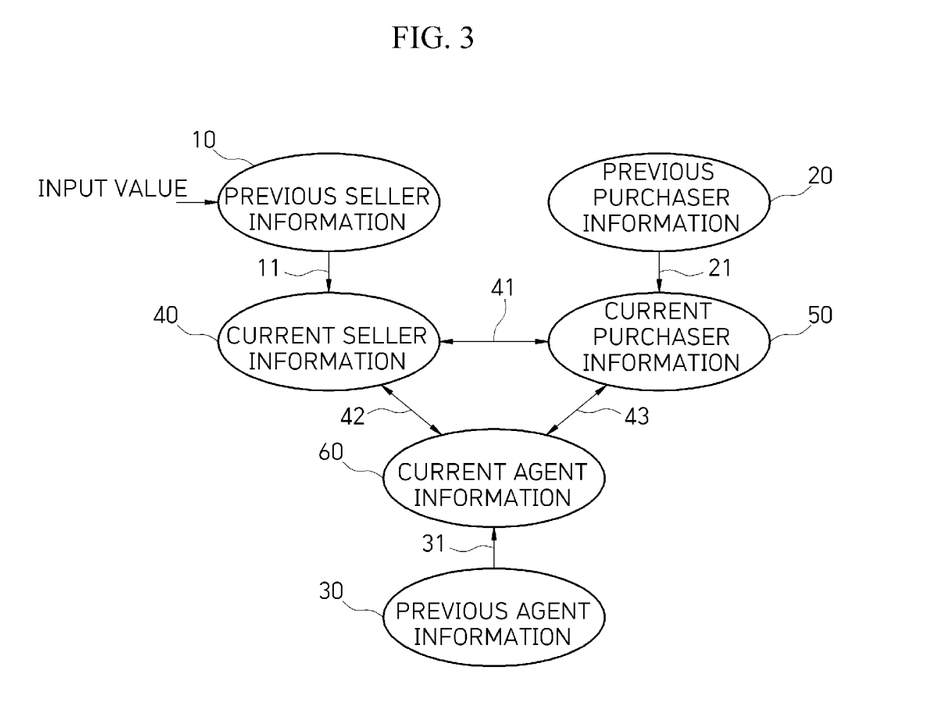
FIGS. 3 to 5 are diagrams for describing three state flow checking processes classified based on an input of an input value in a state diagram illustrated in FIG. 2.
Figure 4:
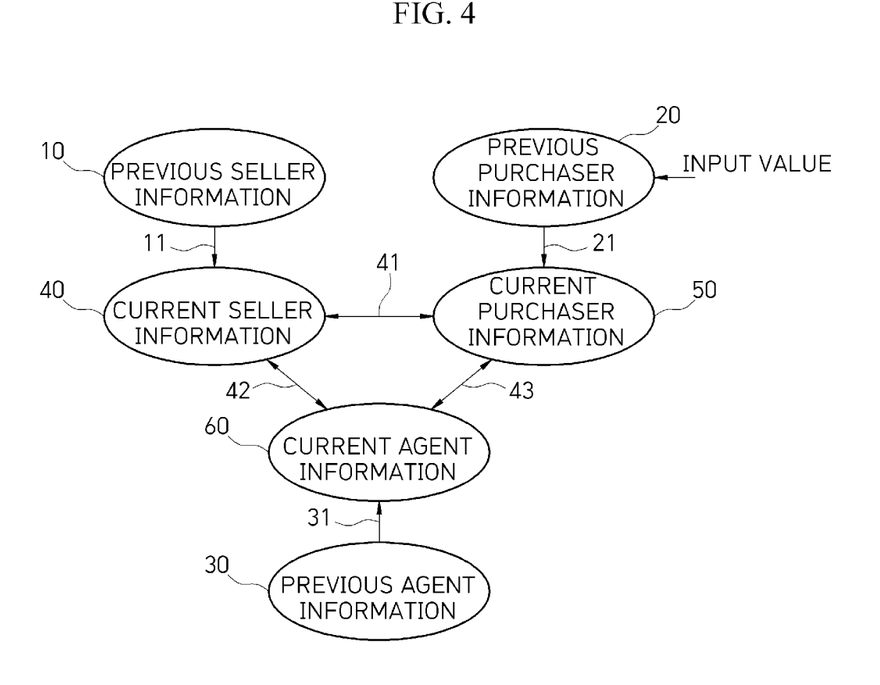
Figure 5:
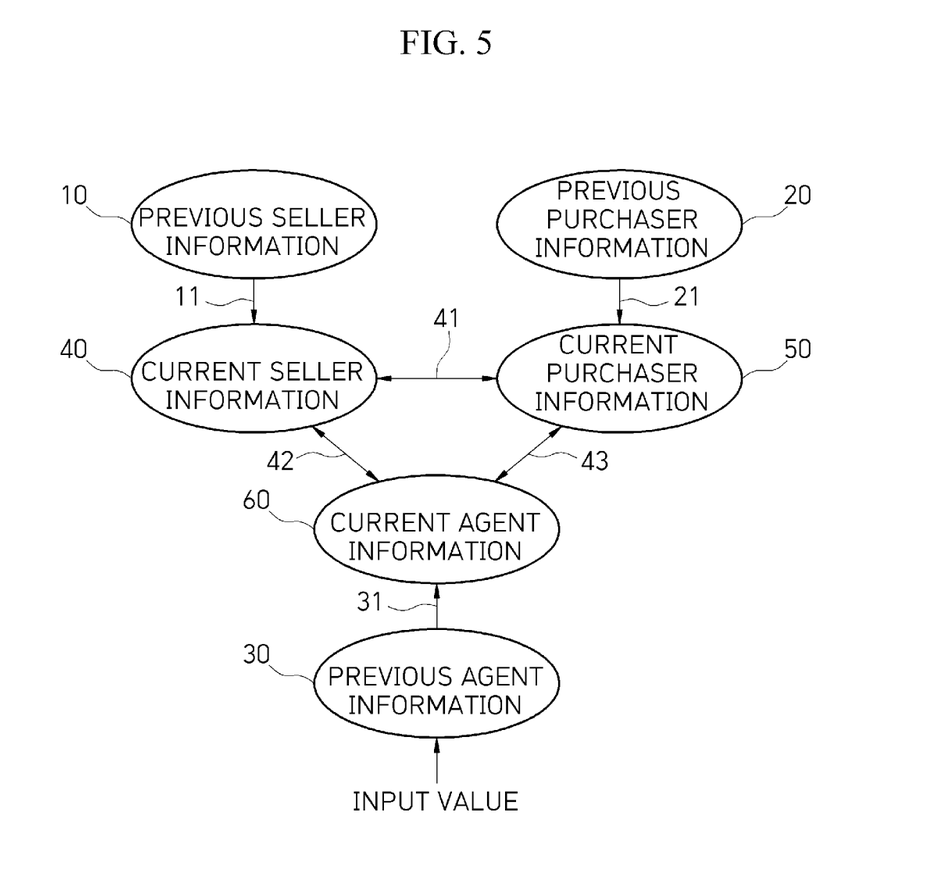

FIGS. 3 to 5 are diagrams for describing three state flow checking processes classified based on an input of an input value in a state diagram illustrated in FIG. 2.

A first state flow checking operation, as illustrated in FIG. 3, may be an operation of inputting an input value (or a test value) for verification to the previous state node 10 corresponding to the previous seller information to check whether a state of each of the nodes 10 to 60 connected to one another by the connection lines 11, 21, 31, 41, 42, and 43 is changed or to check whether an infinite loop occurs in a specific node.

A second state flow checking operation, as illustrated in FIG. 4, may be an operation of inputting an input value for verification to the previous state node 20 corresponding to the previous purchaser information to check whether a state of each of the nodes 10 to 60 is changed or to check whether an infinite loop occurs in a specific node.

A third state flow checking operation, as illustrated in FIG. 5, may be an operation of inputting the input value to the previous state node 30 corresponding to the previous agent information to check whether a state of each of the nodes 10 to 60 is changed or to check whether an infinite loop occurs in a specific node.

Here, for example, a state change of a node may denote that an asset (for example, money, bank balance, cryptocurrency, coin, etc.) or resources (for example, materials, data, files, etc.) possessed by each of a previous state node (for example, a previous seller, a previous purchaser, and a previous agent) and a current state node (for example, a current seller, a current purchaser, and a current agent) is changed based on an input value (for example, money, etc.) input for policy verification.

Three state flow checking operations may be individually performed, and when states of all nodes are changed in a process of checking all state flows, it may be checked that there are no error, occurring in a process of constructing a current smart contract which is to be constructed by the user, and error occurring in a process of affiliating a previous smart contract with the current smart contract which is to be constructed by the user.

For example, when a state of only one node is not changed despite an input of an input value, it may be checked that there are an error, occurring in a process of constructing a current smart contract which is to be constructed by the user, and an error occurring in a process of affiliating a previous smart contract with the current smart contract which is to be constructed by the user.

As described above, the policy verification module 140 may construct a state diagram so that the connection lines 11, 21, and 31 connect previous state nodes, associated with previous smart contract information, to current state nodes associated with current smart contract information and the connection lines 41 to 43 connect the current state nodes associated with the current smart contract information, and thus, an error occurring in a process of affiliating a previous smart contract with a current smart contract and an error occurring in a process of constructing a current smart contract may be checked.

Figure 6:
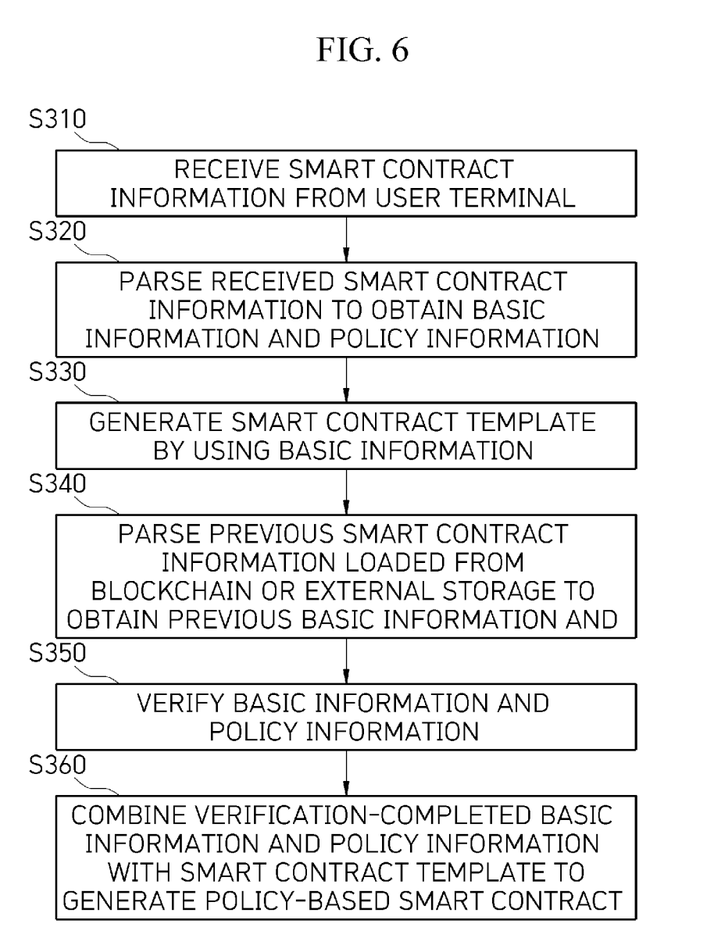
FIG. 6 is a flowchart for describing a smart contract generating method according to an embodiment of the present invention.

FIG. 6 is a flowchart for describing a smart contract generating method according to an embodiment of the present invention.

Referring to FIG. 6, first, a method of generating a policy-based smart contract according to an embodiment of the present invention may perform a process of receiving smart contract information, needed for generating (constructing) a smart contract, from the user terminal 200 through wired/wireless communication by using the communication module 110 in step S310.

Subsequently, in step S320, a process of parsing, by using the first parsing module 120, the smart contract information received from the user terminal 200 to obtain basic information representing content of a smart contract and policy information representing an execution condition of the smart contract may be performed. Here, the basic information may include, for example, seller information associated with a seller, purchaser information associated with a purchaser, and agent information associated with an agent relaying transaction between the seller and the purchaser.

Subsequently, in step S330, a process of generating, by using the smart contract template generating module 130, a smart contract template on the basis of the basic information obtained by the first parsing module 120 may be performed.

In an embodiment, step S330 may include an operation of implementing each of pieces of information, associated with a seller, a purchaser, an agent, price, a commission, a contract start date, and a contract end date included in the basic information, as a code and an operation of converting the code into a template form to generate the smart contract template.

Subsequently, in step S340, a process of parsing, by using the second parsing module 160, previous smart contract information read from a blockchain or a storage to obtain previous basic information representing content of a previous smart contract and previous policy information representing an execution condition of the previous smart contract may be performed. Here, the previous basic information may include, for example, previous seller information associated with a previous seller, previous purchaser information associated with a previous purchaser, and previous agent information associated with a previous agent relaying transaction between the previous seller and the previous purchaser.

In an embodiment, step S340 may include an operation of searching for, by using the search module 150, previous smart contract information capable of being affiliated with the smart contract information in the storage 400 or the blockchain 300 by using the basic information input from the first parsing module 120 as a query, reading the found previous smart contract information from the storage 400 or the blockchain 300, and inputting the found previous smart contract information to the second parsing module 160.

Subsequently, in step S350, a process of verifying, by using the verification module 140, basic information and policy information input from the first parsing module 120 may be performed.

In an embodiment, step S350 may include an operation of generating a state diagram which affiliates the basic information with the previous basic information, based on the policy information and the previous policy information and an operation of verifying an error occurring in a process of generating the smart contract and an error occurring in a process of affiliating the smart contract with the previous smart contract, based on the generated state diagram.

In another embodiment, step S350 may include an operation of generating previous state nodes (for examples, 10, 20, and 30 of FIG. 2) representing a state of the previous basic information, an operation of generating current state nodes (for examples, 40, 50, and 60 of FIG. 2) representing a state of the basic information, an operation of connecting the previous state nodes (for examples, 10, 20, and 30 of FIG. 2) to the current state nodes (for examples, 40, 50, and 60 of FIG. 2) by using the connection lines 11, 21, and 31 representing the previous policy information and connecting the current state nodes (for examples, 40, 50, and 60 of FIG. 2) by using the connection lines 41 to 43 representing the policy information to generate the state diagram which affiliates the basic information with the previous basic information, and an operation of inputting an input value, used to verify the basic information and the policy information, to the state diagram to check whether a state of each of the previous state nodes and the current state nodes is changed, thereby verifying the policy information. Here, when the states of all of the previous state nodes and the current state nodes are changed, the verification module 140 may determine that there is no error in the basic information and the policy information, based on an input of the input value.

In another embodiment, step S350 may include an operation of generating a plurality of previous state nodes representing a state of the previous seller information, a state of the previous purchaser information, and a state of the previous agent information, an operation of generating a plurality of current state nodes representing a state of the seller information, a state of the purchaser information, and a state of the agent information, an operation of connecting the previous state nodes and the current state nodes by using connection lines representing the previous policy information and connecting the current state nodes by using connection lines representing the policy information to affiliate the basic information with the previous basic information, and an operation of inputting an input value, used to verify the basic information and the policy information, to one of a plurality of previous state nodes to check whether a state of each of the previous state nodes and the current state nodes is changed, based on the input of the input value, thereby verifying the policy information.

Subsequently, in step S360, a process of combining, by using the smart contract generating module 170, the smart contract template with the policy information and the basic information, on which verification is completed by the verification module 140, to generate a policy-based smart contract may be performed.

The method of generating a policy-based smart contract may be directly implemented with hardware, a software module, or a combination thereof, which is executed by a processor.

The software module may be provided in RAM, flash memory, ROM, erasable programmable read only memory (EPROM), electrical erasable programmable read only memory (EEPROM), a register, a hard disk, an attachable/detachable disk, or a storage medium (i.e., a memory and/or a storage) such as CD-ROM.

An exemplary storage medium may be coupled to the processor, and the processor may read out information from the storage medium and may write information in the storage medium. In other embodiments, the storage medium may be provided as one body with the processor.

The processor and the storage medium may be provided in application specific integrated circuit (ASIC). The ASIC may be provided in a user terminal. In other embodiments, the processor and the storage medium may be provided as individual components in a user terminal.

Exemplary methods according to embodiments may be expressed as a series of operation for clarity of description, but such a step does not limit a sequence in which operations are performed. Depending on the case, steps may be performed simultaneously or in different sequences.

In order to implement a method according to embodiments, a disclosed step may additionally include another step, include steps other than some steps, or include another additional step other than some steps.

Various embodiments of the present disclosure do not list all available combinations but are for describing a representative aspect of the present disclosure, and descriptions of various embodiments may be applied independently or may be applied through a combination of two or more.

Moreover, various embodiments of the present disclosure may be implemented with hardware, firmware, software, or a combination thereof. In a case where various embodiments of the present disclosure are implemented with hardware, various embodiments of the present disclosure may be implemented with one or more application specific integrated circuits (ASICs), digital signal processors (DSPs), digital signal processing devices (DSPDs), programmable logic devices (PLDs), field programmable gate arrays (FPGAs), general processors, controllers, microcontrollers, or microprocessors.

The scope of the present disclosure may include software or machine-executable instructions (for example, an operation system (OS), applications, firmware, programs, etc.), which enable operations of a method according to various embodiments to be executed in a device or a computer, and a non-transitory computer-readable medium capable of being executed in a device or a computer each storing the software or the instructions.

According to the embodiments of the present invention, an error of a blockchain-based smart contract and an error occurring in a process of cooperating with a conventional smart contract may be prevented, and by using a smart contract template, convenience in writing a smart contract may be enhanced.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of generating a policy-based smart contract blockchain in a smart contract generating apparatus communicating with a user terminal, the method comprising:

through execution by a processor of instructions stored in a memory, the processor performing:

parsing smart contract information received from the user terminal to obtain basic information, as first respective computer-readable codings, representing content of a smart contract and policy information representing an execution condition of the smart contract;

generating a smart contract template on the basis of the obtained basic information;

parsing previous smart contract information read from a blockchain or an external storage to obtain previous basic information, as second respective computer-readable codings, representing content of a previous smart contract and previous policy information representing an execution condition of the previous smart contract;

verifying the basic information and the policy information on the basis of the previous basic information and the previous policy information; and combining the generated smart contract template with the policy information and the basic information, on which verification is completed, to generate the policy-based smart contract blockchain, wherein the verifying of the basic information and the policy information includes performing the verifying by an operation of checking at least one state flow of a state model.

2. The method of claim 1, wherein the generating of the smart contract template comprises:

implementing each of pieces of information, associated with a seller, a purchaser, an agent, price, a commission, a contract start date, and a contract end date included in the basic information, as the respective computer-readable codings; and converting the respective computer-readable codings into a template form to generate the smart contract template.

3. The method of claim 1, wherein the verifying of the basic information and the policy information comprises:

verifying an error occurring in a process of generating the smart contract and an error occurring in a process of affiliating the smart contract with the previous smart contract, based on a state model affiliating the basic information with the previous basic information on the basis of the policy information and the previous policy information.

4. The method of claim 1, wherein the first respective computer-readable codings comprise respective first codings of seller information associated with a seller, purchaser information associated with a purchaser, and agent information associated with an agent relaying transaction between the seller and the purchaser, and the second respective computer-readable codings comprise respective second codings of previous seller information associated with a previous seller, previous purchaser information associated with a previous purchaser, and previous agent information associated with a previous agent relaying transaction between the previous seller and the previous purchaser.

5. The method of claim 4, further comprising:

generating a state model, the generated state model comprising:

a plurality of previous state nodes representing a state of the previous seller information, a state of the previous purchaser information, and a state of the previous agent information;

a plurality of current state nodes representing a state of the seller information, a state of the purchaser information, and a state of the agent information;

connections, between the previous state nodes and the current state nodes, representing the previous policy information; and connections, between the current state nodes by using a connection line representing the policy information to affiliate the basic information with the previous basic information, wherein the verifying of the policy information comprises inputting an input value, to verify the basic information and the policy information, to one of a plurality of previous state nodes of the state model to check whether a state of each of the previous state nodes and the current state nodes is changed based on a result of the input of the input value to the state model to thereby verify the policy information.

6. The method of claim 1, wherein the state model includes previous state nodes representing a state of the previous basic information, and current state nodes representing a state of the basic information.

7. The method of claim 1, wherein the verifying of the policy information comprises:

generating a state model, the generated state model comprising:

previous state nodes representing a state of the previous basic information;

current state nodes representing a state of the basic information;

connections, between the previous state nodes to the current state nodes;

representing the previous policy information; and connections, between the current state nodes, representing the policy information, and to affiliate the basic information with the previous basic information; and inputting an input value, to verify the basic information and the policy information, to the state model to check whether a state of each of the previous state nodes and the current state nodes is changed based on the inputting of the input value to the state model, to thereby verify the policy information.

8. The method of claim 7, wherein the checking of whether the state of each of the previous state nodes and the current state nodes is changed comprises, when the states of all of the previous state nodes and the current state nodes are changed, determining that there is no error in the basic information and the policy information, based on the input of the input value.

9. A method of generating a policy-based smart contract in a smart contract generating apparatus communicating with a user terminal, the method comprising:

parsing, by using a first parsing module, smart contract information received from the user terminal to obtain basic information representing content of a smart contract and policy information representing an execution condition of the smart contract;

generating, by using a smart contract template generating module, a smart contract template on the basis of the obtained basic information;

parsing, by using a second parsing module, previous smart contract information read from a blockchain or an external storage to obtain previous basic information representing content of a previous smart contract and previous policy information representing an execution condition of the previous smart contract;

verifying, by using a verification module, the basic information and the policy information on the basis of the previous basic information and the previous policy information; and combining, by using a smart contract generating module, the generated smart contract template with the policy information and the basic information, on which verification is completed by the verification module, to generate the policy-based smart contract, wherein the verifying of the policy information comprises:

generating previous state nodes representing a state of the previous basic information;

generating current state nodes representing a state of the basic information;

connecting the previous state nodes to the current state nodes by using a connection line representing the previous policy information and connecting the current state nodes by using a connection line representing the policy information to generate a state diagram which affiliates the basic information with the previous basic information; and inputting an input value, used to verify the basic information and the policy information, to the state diagram to check whether a state of each of the previous state nodes and the current state nodes is changed, thereby verifying the policy information.

10. The method of claim 9, wherein the checking of whether the state of each of the previous state nodes and the current state nodes is changed comprises, when the states of all of the previous state nodes and the current state nodes are changed, determining that there is no error in the basic information and the policy information, based on the input of the input value.

11. The method of claim 9, wherein the first parsing module, the smart contract template generating module, the second parsing module, the verification module, the smart contract generating module are a same processor configured to perform the parsing of the smart contract information, the generating of the smart contract template, the parsing of the previous smart contract information, the verifying of the basic information and the policy information, and the combining of the generated smart contract template.

12. A smart contract blockchain generating apparatus comprising:
a processor to execute instructions;
a memory storing the instructions that, when executed by the processor, configure the processor to
parse smart contract information, received from a terminal to obtain basic information, as first respective computer-readable codings, representing content of a smart contract and policy information representing an execution condition of the smart contract,
generate a smart contract template on the basis of the basic information,
search for previous smart contract information, which is capable of being affiliated with the smart contract information, in a blockchain or a storage on the basis of the basic information to read the found previous smart contract information from the blockchain or the storage,
parse the previous smart contract information to obtain previous basic information, as second respective computer-readable codings, representing content of a previous smart contract and previous policy information representing an execution condition of the previous smart contract;
verify the basic information and the policy information on the basis of the previous basic information and the previous policy information; and
generate a policy-based smart contract blockchain through a combination of the smart contract template with the policy information and the basic information, on which verification is completed,
wherein the verifying of the basic information and the policy information includes performing the verifying by an operation of checking at least one state flow of a state model.

13. The smart contract generating apparatus of claim 12, wherein each of pieces of information, associated with a seller, a purchaser, an agent, price, a commission, a contract start date, and a contract end date are respective computer-readable codings, and the processor is further configured to convert the respective computer-readable codings into a template form to generate the smart contract template.

14. The smart contract generating apparatus of claim 12, wherein the processor is further configured to check at least one state flow of a state model to verify an error occurring in a process of generating the smart contract and an error occurring in a process of affiliating the smart contract with the previous smart contract, based on the state model affiliating the basic information with the previous basic information on the basis of the policy information and the previous policy information.

15. The smart contract generating apparatus of claim 14, wherein the state model comprises:
a plurality of previous state nodes representing a state of the previous basic information;
a plurality of current state nodes representing a state of the basic information;
connections, between the plurality of previous state nodes to the plurality of current state nodes based on the previous policy information; and
connections, between the plurality of current state nodes based on the policy information.

16. The smart contract generating apparatus of claim 15, wherein, for when the states of all of the plurality of previous state nodes and the plurality of current state nodes are changed based on a result of an input to the state model, the processor is configured to determine that there is no error in the basic information and the policy information.

17. The smart contract generating apparatus of claim 12, wherein for searching for the previous smart contract information the processor is configured to search for the previous smart contract information in the storage or the blockchain by using the basic information as a query.

18. The smart contract generating apparatus of claim 12, wherein the state model includes previous state nodes representing a state of the previous basic information, and current state nodes representing a state of the basic information.

* * * * *